United States Patent [19]

Rackley et al.

[11] Patent Number: 5,022,329
[45] Date of Patent: Jun. 11, 1991

[54] CYCLONE FURNACE FOR HAZARDOUS WASTE INCINERATION AND ASH VITRIFICATION

[75] Inventors: John M. Rackley; Stanley J. Vecci, both of Alliance, Ohio

[73] Assignee: The Babcock & Wilcox Company, New Orleans, La.

[21] Appl. No.: 406,393

[22] Filed: Sep. 12, 1989

[51] Int. Cl.⁵ ............................................... F23B 7/00
[52] U.S. Cl. ................................... 110/234; 110/229; 110/237; 110/264
[58] Field of Search ............... 110/237, 264, 346, 229, 110/234

[56] References Cited

U.S. PATENT DOCUMENTS

| | | | |
|---|---|---|---|
| 3,855,951 | 12/1974 | Giles | 110/8 R |
| 3,968,052 | 7/1976 | Seglin et al. | 252/373 |
| 4,062,667 | 12/1977 | Hatanaka et al. | 65/135 |
| 4,110,097 | 8/1978 | Chevallier et al. | 65/136 |
| 4,113,459 | 9/1978 | Mattmuller | 65/135 |
| 4,135,904 | 1/1979 | Suzuki et al. | 65/27 |
| 4,497,761 | 2/1985 | Schulte | 264/66 |
| 4,561,364 | 12/1985 | Green et al. | 110/264 X |
| 4,655,968 | 4/1987 | Queiser et al. | 252/632 |
| 4,666,490 | 5/1987 | Drake | 65/27 |
| 4,688,495 | 8/1987 | Galloway | 110/250 |
| 4,700,637 | 10/1987 | McCartney | 110/264 X |
| 4,710,266 | 12/1987 | Hayashi et al. | 159/7 |
| 4,725,383 | 2/1988 | Hayashi et al. | 252/629 |
| 4,760,585 | 7/1988 | Queiser et al. | 373/122 |
| 4,873,930 | 10/1989 | Egense et al. | 110/264 X |

OTHER PUBLICATIONS

*Hazardous Waste: Where to Put It? Where Will It Go?*, Mechanical Engineering, Sep., 1988, pp. 70–75.
"Co-Firing in P-C and Stokers Reduces Wastes, Saves Fuel", *Power*, Oct., 1987, pp. 26 and 28.
Oppelt, T. E., "Incineration of Hazardous Waste—A Critical Review", JAPCA, 35:5, (1987).
Mournighan, Robert E., Olexsey, Robert A., "Surrogate Compounds as Indicators of Hazardous Waste Incinerator Performance", *Incinerating Hazardous Wastes*, Freeman, H., ed., pp. 119–122, 1988.
B & W Preproposal No. R & D 87-349, "Cyclone Furnace for Wastes and Treatment of Contaminated Soils", prepared for U.S. EPA, 12/14/87.

*Primary Examiner*—Edward G. Favors
*Attorney, Agent, or Firm*—Vytas R. Matas; Robert J. Edwards; Daniel S. Kalka

[57] ABSTRACT

An apparatus and method for vitrifying inorganic hazardous material including heavy metals from waste containing organic and inorganic substances. The inorganic hazardous material is retained and vitrified in the slag layer of a cyclone furnace where it is converted to a nonleachable, inert form for safe disposal in conventional landfills and where, simultaneously, organic hazardous substances are completely destroyed.

9 Claims, 3 Drawing Sheets

CYCLONE FURNACE FOR HAZARDOUS WASTE INCINERATION AND ASH VITRIFICATION

BACKGROUND OF THE INVENTION

1. Field of the Invention

The present invention relates in general to an apparatus and method for vitrifying inorganic incinerated waste with the simultaneous destruction of any organic hazardous components, and in particular, is directed to vitrification of the inorganic elements present in the ash of the incineration process, metals or metal fractions, to allow safe disposal in landfills in a nonleachable, inert form. Also, the present invention is directed to an apparatus and method for efficiently destroying RCRA hazardous wastes containing any combination of organic and inorganic constituents while converting the inorganic constituents to an inert, nonleachable vitreous slag.

2. Description of the Related Art

Improved disposal and treatment methods are needed to deal with the growing quantities of hazardous waste produced by various U.S. industries. There is an immediate concern to clean up hazardous waste sites resulting from years of uncontrolled dumping. This concern has been manifested in the passage of Federal laws regulating hazardous waste. The Resource Conservation and Recovery Act of 1976 (RCRA) provided for "cradle to grave" controls in the storage, transport, treatment, and disposal of hazardous waste. The Toxic Substances Control Act (TSCA) in 1979 prohibited the further manufacture of polychlorinated biphenyls (PCBs). The Comprehensive Environmental Response, Compensation, and Liability Act (CERCLA) of 1980 addressed the problem of clean-up of the uncontrolled waste sites with the establishment of a national fund or superfund. More recently in 1986 the Superfund Amendments and Reauthorization Act (SARA) expanded the provisions and funding in such clean-up projects. The impact of these laws affects all of industry and eventually consumers in waste management practices.

While many incineration processes have demonstrated acceptable organics destruction efficiencies as required by 40 CFR 264.343, they still produce unacceptable levels of leachable hazardous inorganics in the fly ash and bottom ash. These ash streams containing metals or metal fractions require additional treatment and/or disposal in Resource Conservation and Recovery Act (RCRA) qualified sites.

Metals such as arsenic, barium, beryllium, chromium, cadmium, lead, mercury, nickel, and zinc are of concern in waste incineration. Even though incineration changes the form of metal fractions in waste streams, the metals are not destroyed, but are emitted in the combustion gases as particles or vapors essentially in the same total quantity as the input. The metals may also be emitted with dry bottom ash and collected fly ash which when disposed in landfills have been shown to leach their metal content into surrounding earth and possibly into drinking water sources. As a result, these metal emissions have a potentially adverse impact on the environment and human health.

An apparatus and method are needed which not only destroy the organic part of hazardous waste, but also convert the inorganic components to a relatively inert form.

Various vitrification processes are known for safe disposal of radioactive waste material as is reflected in U.S. Pat. Nos. 3,321,409; 4,020,004; 4,297,304; 4,376,070; and 4,424,149. U.S. Pat. No. 4,666,490 issued to Drake teaches a vitrification process for treatment of nonradioactive hazardous waste materials in an aqueous stream to produce nonleachable glass matrices suitable for landfill disposal. This reference recognizes the problem of loss of toxic vapor to the atmosphere and provides a tight enclosure to contain the vapors evolved in the heat treating environment. However, this process is limited in only being able to treat small quantities of hazardous organic materials.

A one-step process of incineration and glassification using a high-temperature glass-melting furnace to destroy organics and encapsulate heavy metals is described in an article titled "Hazardous Waste: Where to Put It? Where Will It Go?" in *Mechanical Engineering* magazine, September, 1988, pgs. 70–75. A feeding technique introduces waste materials below the surface of a molten glass pool. The melter operates at a temperature of more than 1150° C. to destroy the organic material while the residual ash is dissolved in the pool of molten glass. The off-gas undergoes an effluent treatment system to remove and neutralize acidic gases generated from the process.

Neither of these prior art approaches recovers the heat from the combustion gases or utilizes existing emission control technology in commercial boiler systems to make safe waste disposal and cleanup applications economically feasible or attractive.

A cyclone combustor or furnace is a high-temperature furnace known in the boiler art to completely destroy combustibles in the fuel while melting the ash into a liquid slag. Fuel is introduced into the burner end of the cyclone furnace with primary air entering the burner tangentially. Secondary air is admitted tangentially at the roof of the cyclone barrel and imparts further centrifugal action to the fuel particles. A small amount of air, tertiary air, is also admitted at the center of the burner. FIG. 1 is a sectional view of a cyclone combustor or furnace. Combustibles in the fuel are burned at heat release rates greater than 450,000 Btu/cu ft, hr. and gas temperatures exceeding 3,000° F. are developed. The incoming fuel particles are thrown to the walls of the cyclone by centrifugal force, held in the slag and scrubbed by high-velocity secondary air. The design of the cyclone furnace is such that the heat release is high and the heat absorption is low.

While it is known to use cyclone furnaces in the manufacture of glass, in general, the use of cyclone furnaces is not readily accepted in the industry since they generate high nitrogen oxides ($NO_x$) emissions which are an unsuitable pollutant.

In addition, except where natural gas is used, other fuels such as oil and coal have potential of creating unburned carbon which enters the glass matrix and is aesthetically unsuitable for general glass manufacture. For purposes described here such aesthetic defects are of little consequence. Moreover, due to the high temperatures generated in a cyclone furnace, the inorganic waste materials have a tendency to vaporize into the flue gas where they exit into the atmosphere adding to pollution.

Thus, there is a need in the industry for an apparatus and method that provides for the incineration of various types of waste material both organic and inorganic with vitrification of the inorganic elements including the heavy metals generated therefrom. A nonleachable, inert form of this portion of the waste is necessary to allow for disposal in a conventional landfill with no adverse impact on public health and the environment. Similarly, the apparatus and method must not contribute to the overall pollution problem by substituting one pollutant for another.

Further, there is a need for this technology to make waste disposal and cleanup of existing hazardous waste sites economically possible and energy efficient.

SUMMARY OF THE INVENTION

The present invention solves the aforementioned problems by providing an apparatus and method for vitrifying inorganic elements generated from the incineration of all types of waste materials including contaminated soils.

The present invention resides in an apparatus and a method for using a cyclone furnace to vitrify the inorganic elements into an inert vitreous slag without releasing further pollutants into the atmosphere. The present invention also resides in the combination of a cyclone furnace with a boiler so that the cyclone furnace receives the ash from the boiler and converts the ash to a vitreous slag suitable for disposal in a conventional landfill.

Accordingly, one aspect of the present invention provides an apparatus and method for efficiently destroying RCRA hazardous wastes containing any combination of organic and inorganic constituents while converting the inorganic constituents to an inert, nonleachable vitreous slag.

Another aspect of the present invention provides for an apparatus for vitrifying inorganic material in a waste containing organic and inorganic substances with heat recovery from the combustion process.

Still other aspects of the present invention provide for methods of operating the cyclone furnace to lower nitrogen oxides formation while increasing retention of metals in the slag including reburning and operating at a lower air-to-fuel stoichiometry.

The various features of novelty characterized in the present invention are pointed out with particularity in the claims annexed to and forming a part of this disclosure. For a better understanding of the invention, the operating advantages attained by its use, reference is made to the accompanying drawings and descriptive matter in which a preferred embodiment of the present invention is illustrated.

DESCRIPTION OF THE PREFERRED EMBODIMENT

Figure 1:
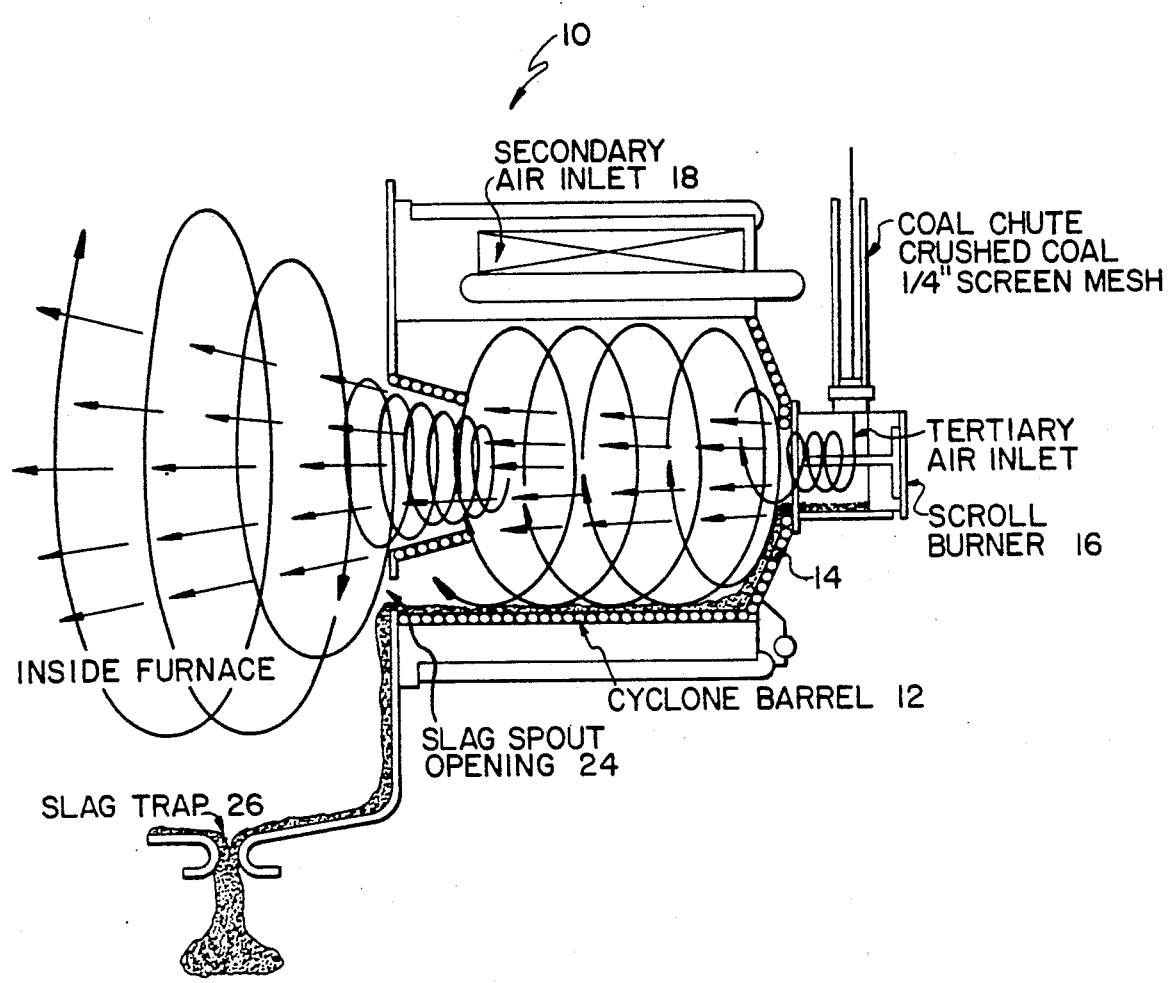
FIG. 1 is a sectional view of a prior art cyclone furnace.

Referring to the drawings in which like reference characters designate like or corresponding parts throughout the several views, in particular, FIG. 1 illustrates a prior art cyclone furnace generally designated 10. The cyclone furnace 10 is a water-cooled horizontal cylinder 12, in which fuel is separately fired, heat is released at extremely high rates, and combustion is completed on a slag layer 14 in the refractory covered main barrel 12 of the cyclone furnace 10. Fuels are introduced into the burner end 16 of the cyclone furnace 10 in a known fashion. Suitable fuels include petroleum and synthetic liquid fuel and a wide range of coals in addition to solid fuels such as wood, bark, coal chars, refuse, refuse chars, and petroleum coke. Suitable gaseous fuels would include natural gas and fuel gases from the gasification of refuse, coal and biomass. The design of the cyclone furnace is such that the heat release is high and the heat absorption is low. This combination assures high temperatures to complete combustion and to provide the desired liquid slag 14. In cyclone furnace 10 firing, volatile matter, ash, and ash viscosity are primary considerations for determining fuel suitability.

In contrast to the normal operating conditions, the present invention operates the cyclone furnace in a controlled manner to prevent or minimize heavy metal and/or inorganic pollutants from vaporizing and exiting into the atmosphere. These pollutants are captured in the slag layer 14 where they are vitrified into a nonleachable, inert form. Any portion of heavy metal constituents which do vaporize are condensed on and captured with ash particulates and are recycled back to the cyclone for incorporation into the molten slag. The molten slag layer 14 in excess of the thin layer retained on the walls 12 continually drains away from the burner end 16 and discharges through the slag spout opening 24.

The control which is to be achieved is that of the slag temperature required for flow from the cyclone. This temperature referred to as the T250 is the temperature required for the molten slag to exhibit a viscosity of 250 poise (the required viscosity for flow out of the cyclone). The temperature for 250 poise needs to be kept below 2500° F. to minimize the vaporization of heavy metals such as lead from the ash and slag. The T250 of the ash to be vitrified is controlled, if necessary, to a temperature of 2300° F. or lower by the addition of fluxing agents such as glass, silica sand, kaolin, etc. for highly basic ashes and by the addition of limestone, dolomite, etc. for acidic ashes.

The viscosity temperature relationships as a function of chemical composition required to guide flux additions already exists in the art of coal ash technology.

With a suitably low T250, either inherent in the material or achieved with a fluxing agent, the furnace temperature and hence the slag temperature is controlled through manipulation of furnace operating parameters such as fuel rate per pound of ash input. The objective is to operate as close to adiabatic conditions as possible, confining as much of the furnace heat rejection to the slag.

Figure 2:
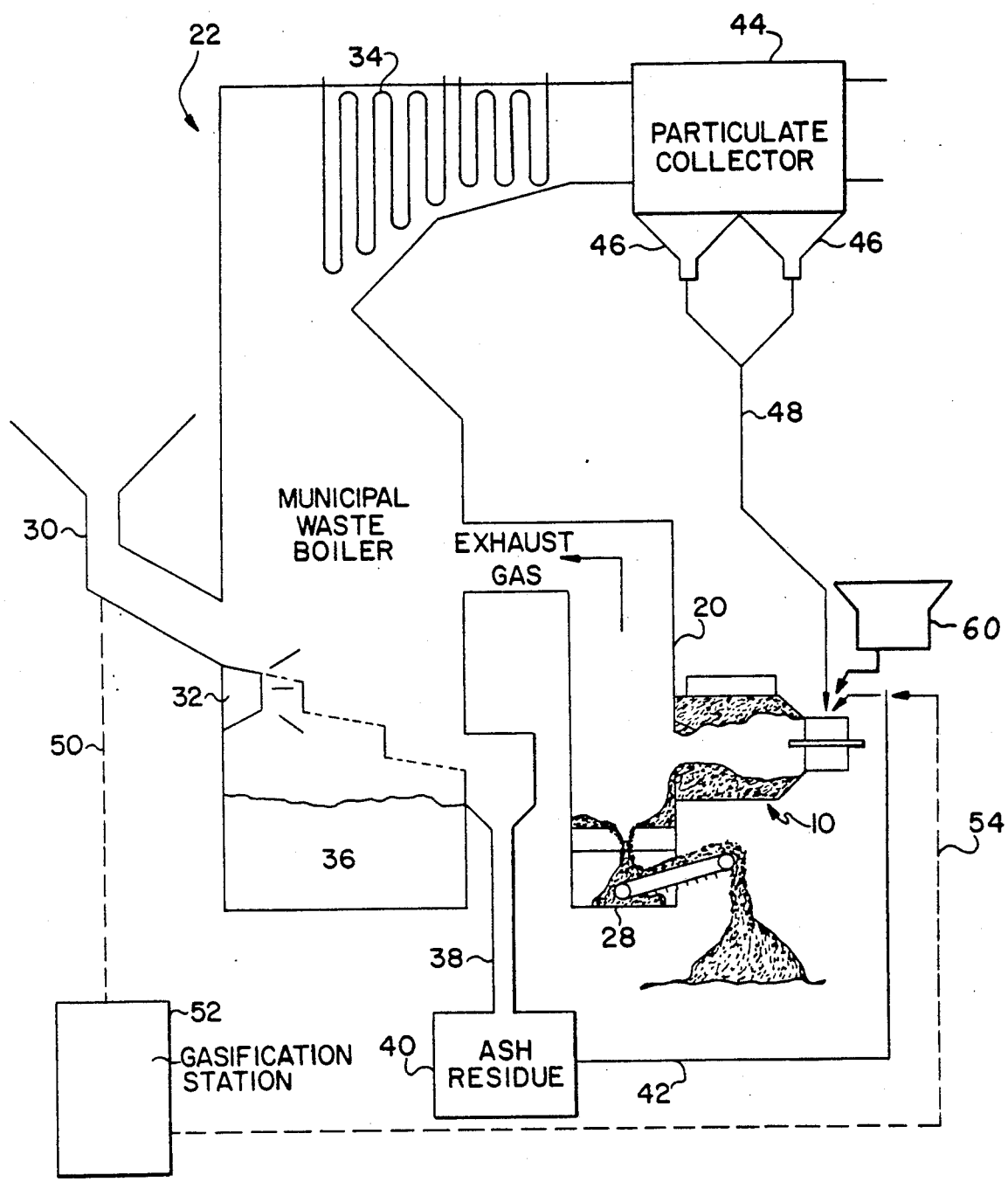
FIG. 2 is a cross-sectional schematic representation of an embodiment of the present invention illustrating a cyclone furnace in combination with a municipal waste boiler.

Next referring to FIG. 2, the hot exhaust gas exits the cyclone furnace 10 in the direction of the arrow through duct 20 and passes through the main boiler generally designated 22 while the slag 14 drains out of the cyclone furnace 10 through the slag spout opening 24 to the slag tap 26. The liquid slag 14 flows into the slag tank 28 where it is solidified for disposal.

In FIG. 2, a hopper 30 holds prepared municipal waste for firing in the boiler 22, or in the alternative some of the waste can co-fire the cyclone furnace 10 through the introducing means (60). The burning of municipal waste is self sustaining after being ignited with oil or gas burners. In standard practice the main furnace for burning municipal waste may incorporate a variety of designs including traveling grates or rotary kilns. The municipal waste is delivered to the furnace and a controlled amount of air is provided through various ports to allow optimum combustion conditions. Bottom and fly ash is formed in the combustion process. The heat from the combustion gases is recovered in a known fashion through the use of tube banks generally designated 34. Tube banks in boilers for optimal heat recovery from combustion gases are known in the art and normally consist of membrane tubing, primary and secondary superheater, reheater, and economizer sections.

The bottom ash 36 is removed from the bottom of the boiler 22 by chute 38 connected to ash tank 40. The bottom ash 36 may be transported pneumatically or in any conventional manner via line 42 to the burner end 16 of the cyclone furnace 10 for injection and subsequent vitrification.

The flyash is collected with a particulate collector 44 in a known fashion downstream from the tube banks 34. Suitable particulate collectors 44 include electrostatic precipitators, mechanical collectors, or fabric filters. The collected flyash is stored in hoppers 46 where it is later transported either pneumatically or in a conventional manner via line 48 to the burner end 16 of the cyclone furnace 10 for injection and subsequent vitrification.

The formation of a vitreous slag in the cyclone furnace 10 is influenced by the composition of the melt, temperature, residence time, and dynamics of metals addition. As a result, it may require the addition of fluxing agents such as limestone, sand, glass, etc. depending on the particular chemistry of the bottom ash and flyash. The fluxing agent is added through a separate injector, or with the primary or secondary combustion air, or it may even be co-mingled with the bottom ash in a quantity required to maintain a fluid slag (less than or equal to 250 poise) at 2300° F. or less. Maintaining a viscosity of 250 poise or less is imperative to allow the slag to flow from the cyclone furnace 10 while avoiding temperatures in excess of 2500° F. to retain the heavy metals in the slag instead of vaporizing them into the combustion gases.

The heat absorption in the cyclone furnace 10 is designed so as to encourage the formation of wall slag 14 while maintaining high temperatures. The gas temperatures in the cyclone furnace 10 operating in a normal fashion are about 3000° F. and in the lower portion of the furnace about 2400-2800° F. The inorganic hazardous wastes and ash from the incinerated organic wastes are captured in the molten slag 14 where they are vitrified and continuously flow out of the cyclone furnace 10 through the slag spout opening 24 to the slag tap 26 into the slag tank 28 for safe disposal.

In an alternate embodiment depicted in FIG. 2 by dashed lines, a portion of the fuel from hopper 30 is transported by line 50 to a gasification station 52. The gasification station 52 operates in a known manner to produce combustible gas. The combustible gas passes through line 54 to fire the cyclone furnace 10. The gasification process at station 52 produces a residue char which is relatively dry compared to municipal solid waste. This char may also be used to fire the cyclone furnace 10, or burned with the refuse in the burner 32.

The preferred manner of reducing $NO_x$ production is to operate the cyclone furnace 10 at an air-to-fuel stoichiometry of less than 1. This creates a reducing environment resulting in lower $NO_x$ production and lower operating temperatures in the cyclone furnace 10. The lower operating temperature in the cyclone furnace 10 increases the retention of heavy metals in the slag.

Such operation with stoichiometries of less than 1 may be accomplished when the cyclone is constructed of a sacrificial material such as refractory. However, experience has shown that when the cyclone is water cooled, it is necessary to keep the metal temperatures very low in order to avoid corrosion that occurs with reducing atmosphere operation. When it is necessary to introduce the cyclone cooling water into the boiler circuit and thus potentially raise the operating temperatures of the metals, a preferred embodiment for $NO_x$ control consists of reburning where the cyclone is operated in an oxidizing atmosphere to avoid reducing metal corrosion phenomena.

Operating the cyclone at air-to-fuel stoichiometries less than 1 has an added benefit beyond reduced furnace temperatures with resulting better heavy metal retention and reduced nitrogen oxides production. Under reducing conditions, many slags, especially those rich in iron exhibit a lower T250 thereby further increasing the trapping potential of the slag for heavy metals.

Alternatively, the cyclone furnace flue gas outlet may be modified to allow the use of reburning fuel for $NO_x$ control. In addition to traditional reburning fuels such as natural gas, pre-gasification of municipal solid waste as described earlier as an alternative embodiment depicted in FIG. 2 would provide a suitable gaseous fuel for reburning.

Figure 3:
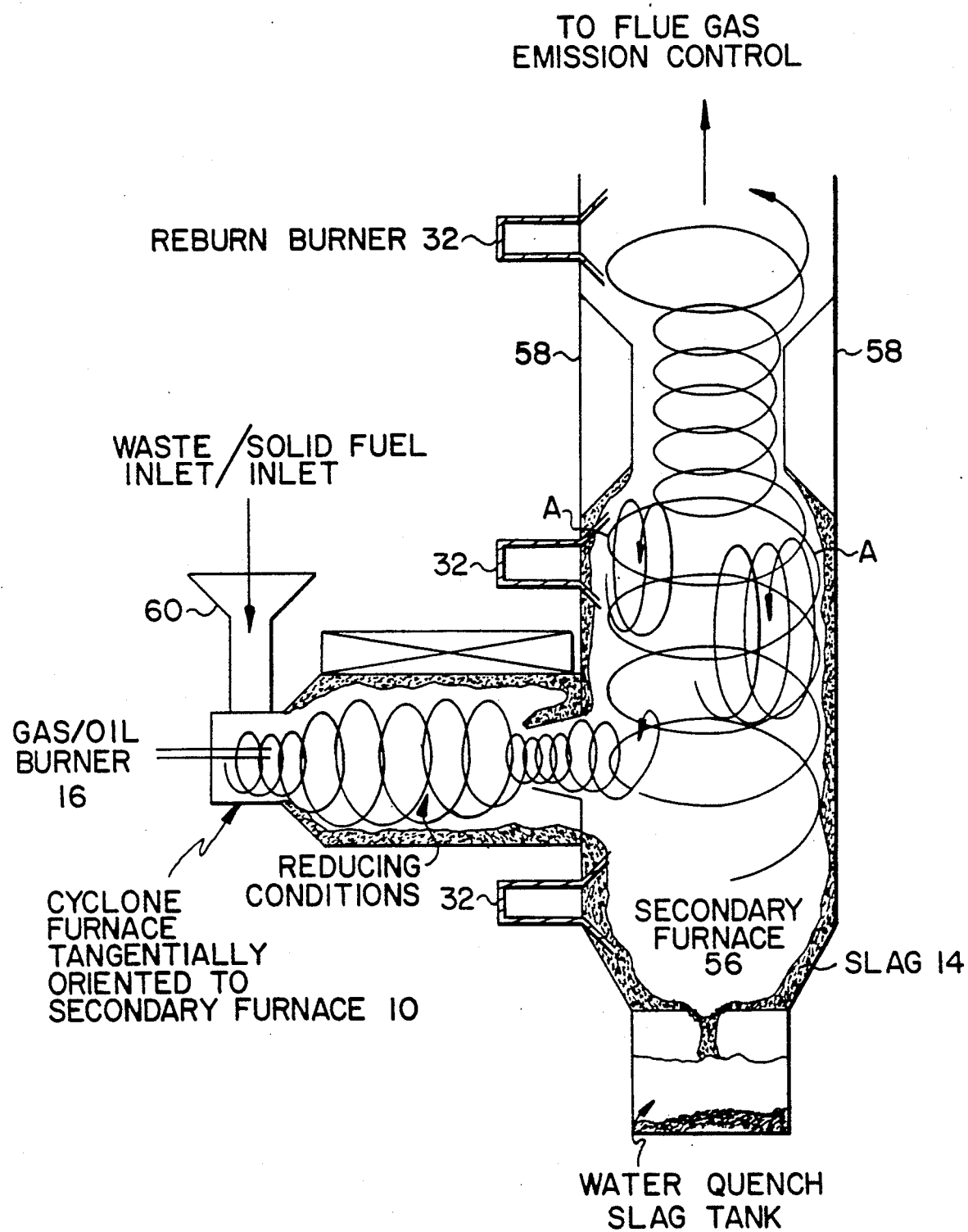
FIG. 3 is a cross-sectional illustration of another embodiment of the present invention depicting a cyclone furnace firing into a secondary furnace.

In another embodiment illustrated in FIG. 3, the cyclone furnace 10 fires into a secondary furnace 56. Secondary furnace 56 has at least one reburn burner 32 but may contain a plurality in several locations as shown in FIG. 3. The secondary furnace 56 includes a flow restriction 58 to provide gas recirculation and increase residence time for greater destruction of refractory organics, and to increase the retention of fine organic particles in the slag 14. The cyclone furnace 10 is oriented tangentially to the secondary furnace 56. This orientation increases the combustion gas residence time and inorganic particulate collection efficiency of the slag layer 14 in the secondary furnace.

It should be recognized there will be occasions where the cyclone furnace 10 will be required to render non-hazardous materials that are introduced in large contaminated containers. In this particular case, the large containers can be introduced into the secondary furnace through a chute-type introduction system.

When reburning is used to destroy $NO_x$ created in the cyclone furnace 10, the reburning fuel which separately fires the reburning burners 32 is used to create a reducing zone, i.e., one with insufficient air for the combustion of the fuel introduced, so as to reduce the $NO_x$ created in the cyclone furnace 10 as the $NO_x$ flows through this reducing zone. Of course it is then necessary to follow the reducing zone with additional air introduction in order to burn all of the hydrocarbon radicals formed in the reducing zone.

The use of the reburning technique does not adversely affect refuse capacity. Gasification of a portion of the refuse to create both gases and chars to either fire the cyclone furnace 10 or accomplish the reburning technique described provides still another advantage to the present invention.

Flow restriction 58 provides a recirculation pattern in the secondary furnace 56 as indicated by arrows A which is a circular motion near the walls. This is fed with a backflow from the restrictor 58 towards the slag tap 26 in the center of the secondary furnace 56. This flow reversal causes retention of particulate for additional residence time. Keeping in mind that gas flow is on a once-through basis the flow restrictor 58 does not change the average gas residence.

Factors influencing amount of particle recirculation and residence time required for metal retention include the chemical form of the heavy metals, particle size, furnace temperature as well as size of the restriction.

Tables 1 and 2 contain the results of a municipal solid waste fly ash vitrification test conducted at 100 lb/hr; and 200 lb/hr, respectively performed with a pilot scale cyclone furnace. The vitrification process of the present invention substantially reduces the leachability of the heavy metals. In particular, the cadmium (Cd) and lead (Pb) leachabilities which were far above allowable limits are now well below them. This data reflects the leachability of these materials in the municipal solid waste (MSW) ash before and after vitrification in the cyclone furnace.

In normal operation, a coal-fired cyclone experiences a fly ash loading of not more than 25 pounds of ash contained in each 100 pounds of coal. These tests demonstrated that the process can accommodate at least four times as much fly ash for the same BTU input.

TABLE 1

MUNICIPAL SOLID WASTE FLY ASH VITRIFICATION TEST

EP-Toxicity (Leachable) Metals 100 lb/hr Test[1]

| Element (mg/L) | Before Vitr. MSW Ash Feed | After Vitr. slag | USEPA Limits[2] |
| --- | --- | --- | --- |
| As | 0.02, 0.17 | (<0.005) | 5.0 |
| Cd | 3.8, 3.8 | (<0.01) | 1.0 |
| Cr | 0.11, 0.28 | (<0.02) | 5.0 |
| Pb | 38, 53 | 0.3, 0.21 | 5.0 |
| Hg | (<0.005) | (<0.005) | 0.2 |
| Ba | 0.33, 0.38 | 0.42, 0.24 | 100 |

[1] Values in parenthesis give detection limit for elements not detected in a particular sample.
[2] USEPA 40 CFR Part 261 Subpart C (7-1-87 ed.) Maximum Concentrations of Contaminants for Characteristic of EP-Toxicity.

TABLE 2

EP-Toxicity (Leachable) Metals 200 lb/hr Test[1]

| Element (mg/L) | Before Vitr. MSW Ash Feed[2] | After Vitr. (4 Samples)[3] | USEPA Limits[4] |
| --- | --- | --- | --- |
| As | 0.08 | (<0.005) | 5.0 |
| Cd | 6.3 | (<0.01) | 1.0 |
| Cr | 0.22 | (<0.02) | 5.0 |
| Pb | 57 | 0.32, 0.21, 0.25, 0.25 | 5.0 |
| Hg | (<0.005) | (<0.005) | 0.2 |
| Ba | 0.30 | 0.18, 0.17, 0.15, 0.19 | 100 |

[1] Values in parenthesis give detection limit for elements not detected in particular sample.
[2] Drums 1-5 (M-45174).
[3] Values for M-45173, M-45176, M-45176 (duplicate analysis) and M-45175, respectively.
[4] USEPA 40 CFR Part 261 Subpart C (7-1-87 ed.) Maximum Concentrations of Contaminants for Characteristic of EP-Toxicity.

Accordingly, the present invention has a high degree of flexibility with respect to waste forms and compositions with the further advantage of having the ability to be a mobile facility or a transportable system for cleanup of an existing hazardous site. In the mobile system, the cyclone furnace is solely employed but operated in a controlled manner with the proper selection of temperature, viscosity, composition, residence time, and injection method. Mercury (Hg) is not expected to be retained in the slag 14.

While a specific embodiment of the invention has been shown and described in detail to illustrate the application and principles of the invention, certain modifications and improvements will occur to those skilled in the art upon reading the foregoing description. It is thus understood that all such modifications and improvements have been deleted herein for the sake of conciseness and readability but are properly within the scope of the following claims. Such a modification includes employing a plurality of cyclone furnaces in a boiler.

We claim:

1. An apparatus for vitrifying inorganic material in a waste containing organic and inorganic substances, comprising:
    a boiler having at least one burner for incinerating a fuel and recovering heat of combustion gases produced therefrom;
    a cyclone furnace separately fired attached to said boiler for receiving ash from said boiler and converting the ash into a vitreous slag; and
    means for introducing the waste into said cyclone furnace for destruction of the organic and vitrification of the inorganic substances.

2. An apparatus as defined in claim 1, further comprising:
    a hopper connected to said boiler for storing ash from the bottom thereof; and
    means for transporting the ash to said cyclone furnace for conversion to vitreous slag.

3. An apparatus as defined in claim 1, further comprising:
    a flue gas duct for carrying flue gases from the boiler;
    a particulate collector connected along the flue gas duct for removing particulate from the flue gas passing along the flue gas duct; and
    means for transporting the collected particulate to said cyclone furnace for conversion to vitreous slag.

4. An apparatus as defined in claim 1, further comprising:
    means for separating a portion of the waste prior to said boiler; and
    means for gasifying the separated portion to produce fuel for said cyclone furnace.

5. An apparatus for controlling hazardous waste containing organic and inorganic materials comprising:
    a furnace having at least one burner for incinerating a fuel, said furnace including means for restricting flow at the exit to recirculate combustion gas and increase residence time for destroying the organics and vitrifying the inorganic substances;
    a cyclone furnace separately fired attached to said furnace, said cyclone furnace firing into said furnace; and
    means for introducing waste into said cyclone furnace for destruction of the organic and vitrification of the inorganic materials.

6. An apparatus as defined in claim 5, wherein said cyclone furnace is oriented tangentially to said furnace to further increase combustion gas residence time and collection of inorganic materials.

7. An apparatus as defined in claim 5, wherein said furnace includes at least one reburn burner for reburning fuel for No$_x$ control.

8. An apparatus for vitrifying inorganic material, comprising:

a boiler having at least one burner for incinerating a fuel and recovering heat of combustion gases produced therefrom;

a cyclone furnace attached to said boiler for receiving ash from said boiler and converting the ash into a vitreous slag; and means for transporting the ash to said cyclone furnace for conversion to vitreous slag.

9. An apparatus as defined in claim 8, further comprising a hopper connected to said boiler for storing ash.

* * * * *